April 18, 1950     A. BOUWERS ET AL     2,504,383
REFLECTING TYPE TELESCOPE HAVING A SPHERICAL MIRROR
Filed Dec. 18, 1945     2 Sheets-Sheet 1

INVENTORS
ALBERT BOUWERS
JOHANNES BECKER AND
ADRIAAN HENDRIK VAN GORUM

ATTORNEY

INVENTORS
ALBERT BOUWERS
JOHANNES BECKER AND
ADRIAAN HENDRIK VAN GORUM

ATTORNEY

Patented Apr. 18, 1950

2,504,383

UNITED STATES PATENT OFFICE 2,504,383

REFLECTING TYPE TELESCOPE HAVING A SPHERICAL MIRROR

Albert Bouwers, Johannes Becker, and Adriaan Hendrik van Gorcum, Delft, Netherlands, assignors to N. V. Optische Industrie "De Oude Delft," Delft, Netherlands Application December 18, 1945, Serial No. 635,686 In the Netherlands August 8, 1945

6 Claims. (Cl. 88—32)

Telescopes having a concave main mirror, a collecting mirror which is centered with respect thereto, and an ocular are known. The collecting mirror has for its purpose to reflect in the direction of the main mirror the light rays coming from the main mirror. Despite a given limited length of construction this permits the focal distance to be made large. As examples we may mention the Cassegrainian system having a convex collecting mirror and the Gregorian system having a concave collecting mirror. To eliminate the projecting errors inherent to these systems, it is necessary to give the two mirrors aspherical surfaces. In the Cassegrainian system the concave mirror is given a parabolical surface and the collecting mirror a hyperbolical surface to eliminate spherical aberration. If, moreover, it is desired to correct the coma, the aspherical surfaces become more complicated (Chrétien's telescope).

The Gregorian system can be corrected in regard to spherical aberration by making use of a parabolical main mirror and an elliptical concave collecting mirror, whilst the two reflecting surfaces must have complicated aspherical surfaces (Schwarzschild's telescope) to correct also coma.

Again it is known per se that a satisfactory quality of the image, consequently also elimination of spherical aberration and coma, is obtainable by means of the so much simpler spherical surfaces of a mirror-system consisting of a spherical mirror and a corrector having spherical surfaces.

We have now found that the use of spherical surfaces, a mirror-system having a centered spherical or flat collecting mirror and ocular leads in many cases to a telescope having astonishing properties.

The telescope according to the present invention is equipped with a concave spherical main mirror whose focal distance is at the most four times its free aperture, a spherical or flat collecting mirror which is centered with respect to the former, an ocular and a corrector having exclusively spherical outer surfaces which is likewise centered with respect to the main mirror.

The telescope according to the invention has the advantage of a very large light gathering power, a surprisingly small length and a light construction. The combination of these advantages make the telescope suitable both for astronomical and for terrestrial purposes.

Another advantage of the telescope according to the invention over the hitherto known mirror-telescopes consists in that an extremely accurate state of correction is obtainable, both in regard to spherical aberration and to coma, without having to resort to grinding and polishing of aspherical surfaces, which particularly in regard to the concave mirror and the collecting mirror is extremely difficult and time consuming.

It is self-explanatory that this present telescope may be used not only for visual purposes, but also in photography by providing, at the image projected by the objective-portion, the sensitised layer of a photographic plate or film.

The corrector having exclusively spherical surfaces, which is used in the telescope, may consist either of a negative meniscus lens or of a system of lenses which, considered as a whole, has the character of such a negative meniscus lens, thus obtaining the required correction in regard to spherical aberration.

Apart from the aforesaid drawbacks involved by the Cassegrainian, Gregorian and similar telescopes, the use thereof was impeded, moreover, by the well-known fact that the light rays falling along the collecting mirror and directly entering the ocular bring about a very annoying straylight in the image. In the well-known British telescopes, for instance, this drawback is cured by placing a diaphragm directly in front of the eye, but this is in itself rather troublesome to the observer.

In one form of construction of the telescope according to the invention this stray light can be avoided in a simple and suitable manner by providing, according to the invention, in the space between the collecting mirror and the main mirror one or more tubular diaphragms having such a size that substantially all light rays entering the telescope in such a direction as not to be reflected at the main mirror and the collecting mirror, are intercepted by them.

According to another form of construction of the telescope according to the invention the collecting mirror is fitted to the correcting element, thus avoiding placing the collecting mirror on a separate support.

If, moreover, the collecting mirror is, according to the invention, not made separately adjustable with respect to the correcting element, but if this collecting mirror is rigidly secured to the main mirror, one obtains a great simplification in adjusting the whole telescope.

In a particular suitable form of construction of the telescope according to the invention the surface of the collecting mirror is given the same radius of curvature as the corrector surface facing the concave mirror, which surfaces preferably coincide. In this case the collecting mirror is obtained by making the central part of the corrector surface facing the concave mirror reflecting.

The telescope according to the invention may be equipped with a convex, flat or concave collecting mirror, which types of collecting mirrors each have special advantages.

When equipping the telescope according to the invention with a convex collecting mirror of about twice the diameter of the free aperture of the objective portion (consisting of the corrector and of the main mirror) an extremely small length of the construction is obtained. In eliminating the spherical aberration of the whole optical telescope system, use may advantageously be made of the correcting effect of such a convex collecting mirror.

If this type is resorted to for terrestrial use, it is very advisable that the image should be inverted. In one form of construction of the telescope according to the invention this is obtained by providing an image inverting prism-system directly behind an aperture made in the concave mirror, thus obtaining a suitable and simple positioning. According to the invention it is advisable that for this purpose use should be made of a prism-system, according to Porro, of the second kind, in order to reduce the length of the telescope construction as much as possible.

In another type of the telescope according to the invention it comprises a flat collecting mirror, an inverting lens system being placed in the path of the rays between the collecting mirror and the ocular. Optically this means that the image, projected by the objective portion and the flat collecting mirror, is viewed through a microscope, the inverting lens-system constituting the objective and the ocular of the telescope constituting the eye-glass of the microscope.

In this construction the prism-system is missing, which usually involves a shift of the beams and is very useful inter alia for monocular terrestrial telescopes, wherein the optical axes of objective and ocular coincide.

A third type of a telescope according to the invention comprises a concave collecting mirror. This type has the advantage that the image is upright, so that an additional inverting system may be dispensed with.

We have earlier proposed to equip a telescope with a finder and one or more movable mirrors in such manner that during observation either the slightly enlarged finder image having a large field of view or the highly enlarged telescope image having a small field of view can be viewed at will through the same ocular.

With the telescope according to the present application, which has a convex or flat collecting mirror, the same purpose can be attained according to the invention, by providing the corrector with an aperture in which the finder-objective is provided, the collecting mirror being movable out of its operative position by means of a mechanism—preferably controlled by a Bowden wire—in such manner as to allow the observer to move or shift the collecting mirror at will out of its operative position. The observer views the image then, which is projected by the finder-objective, slightly enlarged and with a large field of view, and the image, with the collecting mirror in its operative position, greatly enlarged and with a small field of view, this image being projected by the corrector, the main mirror and the collecting mirror.

In the present case the desired effect is secured in an extremely simple and suitable manner. In fact, not a single additional mirror is used; the collecting mirror of the greatly magnifying telescope is solely shifted. Second, no separate finder-tube need be made and finally the finder and the telescope have an optical axis in common, which means that there is no parallax between finder- and telescope-image.

In order that the invention may be clearly understood and readily carried into effect it will now be described more fully by reference to the accompanying drawing, given by way of example, in which Fig. 1 is a section of one form of construction of the telescope according to the invention;

Figures 7, 8:
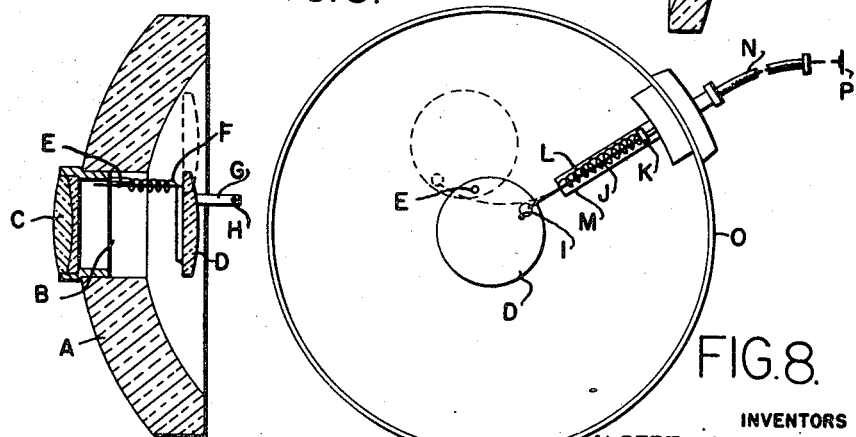

Fig. 7 is a cross-sectional view of the correcting lens and an associated collecting mirror and objective lens of another embodiment of the invention adapted to permit the observer selectively to view a finder image or an enlarged image; and Fig. 8 is a rear view of the apparatus of Fig. 7 illustrating the means whereby the collecting mirror may be selectively placed to permit the selective viewing hereinbefore mentioned.

Figure 1:
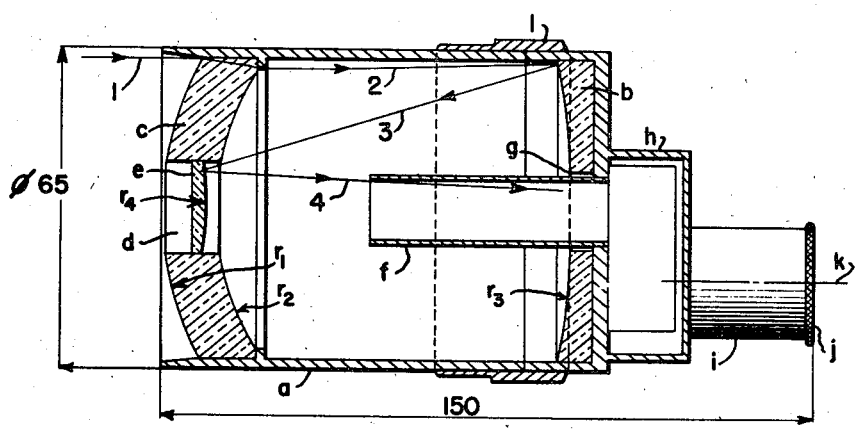
Figure 2:
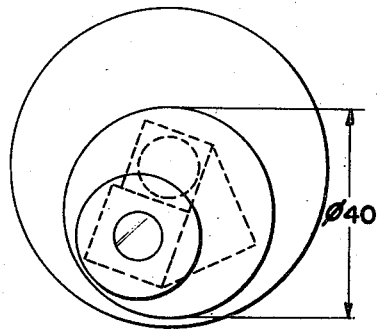
Fig. 2 is a rear view of the telescope of Fig. 1.
Figure 3:
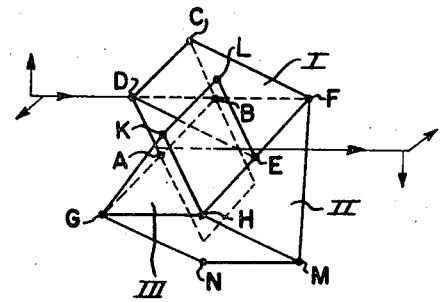
Fig. 3 is a perspective view of the prism system in the ocular of Fig. 1.

Referring now to Fig. 1, in the housing $a$ of the telescope are fitted the concave spherical main mirror $b$ and the corrector $c$ which is centered with respect to this main mirror. The central aperture $d$ in this corrector is engaged by the convex spherical collecting mirror $e$ which is likewise centered with respect to the main mirror $b$. The housing $a$ of the telescope furthermore contains the tubular diaphragm $f$ which leads through the central aperture $g$ in the main mirror $b$ to the prism housing. The latter contains a prism-system according to Porro of the second kind, of which the outlines are indicated in dotted lines in Figure 2 which is a rear view of the telescope. Fig. 3 is a perspective view of this system. It comprises three totally reflecting 45° prisms I, II, III. To the prism housing $h$ is secured the ocular tube $i$ in which the ocular $j$ is movable. The optical axis $k$ of the ocular $j$ extends perpendicularly to the square plane of emergence KLEH of the prism III and cuts this plane in the center of the square.

The path of the rays in the telescope is as follows:

The light ray 1 coming from an object passes the corrector $c$ and proceeds as 2 until it is reflected at the main mirror $b$ and falls as 3 on the convex collecting mirror $e$ by which the ray is reflected as 4. Through the tubular diaphragm $f$ the ray 4 reaches the plane of incidence ABCD of the prism. In the conventional way, the ray traverses the prism-system until it emerges from the plane KLEH of prism III and passes to the ocular. The image projected by the system consisting of the main mirror $b$, the corrector $c$ and the collecting mirror $d$ of an object is inverted. Owing to the interposition of the system of prisms the ultimate image viewed through the ocular is upright.

In the absence of the tubular diaphragm $f$ a number of light rays entering the telescope through the corrector $c$, will find their way to the ocular directly through the central aperture $g$ in the main mirror and through the prism system, consequently without reflection at the main and collecting mirror, thus causing a very troublesome false light. By providing the diaphragm $f$, substantially all of these rays are eliminated before reaching the prism housing, thus avoiding this false light in a simple and effective manner.

The corrector $c$ has the shape of a meniscus lens and has two spherically ground surfaces. Its power is negative. Since the convex side of $c$ faces the incident light, the rays incident to the first positive surface are reflected towards the optical axis. Consequently the incident light beams undergo a decrease in section in the corrector, as a result of which the section of the telescope housing between the corrector and the mirror can be kept small despite the diverging effect of the negative corrector as a whole.

By the spherical overcorrection of the corrector, the spherical undercorrection of the system consisting of the concave mirror $b$ and the convex collecting mirror $e$ is just made up for. Between the radii of curvature $r_1$ and $r_2$, the thickness at the middle $d$ and the refractive index $n$ of the glass of the corrector the following relation exists:

$$d = \frac{n^2}{n^2-1}(r_1-r_2)$$

Thus the corrector is chromatically corrected, though it only consists of one kind of glass. The expression "thickness at the middle" is to be understood to mean the thickness measured along the optical axis if the central aperture $d$ be left out.

The optical system, which constitutes the objective of the telescope and consists of the corrector, the concave main mirror and the convex collecting mirror, has only four spherically ground surfaces and is satisfactorily corrected both monochromatically and chromatically.

The structural data of the objective portion are as follows (all measures in mm.): the corrector has radii of curvature $r_1 = 63.10$ and $r_2 = 57.54$ and a thickness at the middle of $d = 10$, and is made from boron silicate crown with $n_D = 1.516$ and a dispersion number $V = 64.1$.

The spherical main mirror has a radius of curvature $r_3 = 200$ and a convex collecting mirror $r_4 = 77.63$.

The distance of the second surface of the corrector from the main mirror, measured along the optical axis, is 70 and the distance between the main mirror and the collecting mirror is 73.

The free aperture of the main mirror is 59 mm. so that the focal distance of this mirror is 1.7 times its free aperture.

The focal distance of the whole objective portion is 465, its free aperture is 60 so that a 22 x 60 telescope is obtained with an ocular having a focal distance 21.

The principal measures of the telescope are indicated in Fig. 1, from which appears the small size of the instrument so that it is easy to handle despite its high light gathering power and great magnification. The weight also is very small, the complete telescope only weighing 350 gms.

The focusing of the telescope takes place by turning the adjusting ring shown. The mechanism thereof is not shown in detail in the drawing.

For various uses it is desirable, in conjunction with the great magnification, not to hold the telescope loosely in the hand, but to fix it. This may, for instance, be effected in a simple and effective manner by screwing the telescope to a portable telescoping photo-stand.

Finally it is pointed out that two telescopes as described hereinbefore permit a binocular instrument to be built without the need for additional means.

Figure 4:
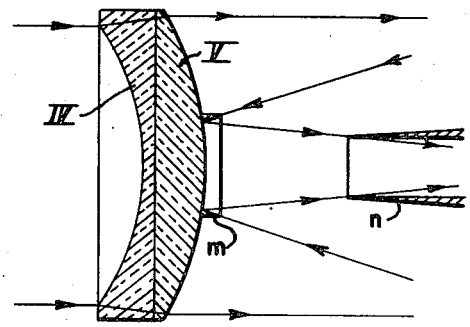
Fig. 4 is a longitudinal sectional view of another embodiment of the invention in which a compound lens is employed in the objective and in which the collecting mirror is formed on one of the surfaces of the compound lens adjacent the ocular.

In a second form of construction, which for the greater part corresponds to the first example, a different corrector is used, which is shown in Fig. 4. This corrector consists of two components IV and V which are connected through a flat cement surface. The corrector, considered as a whole, is a negative meniscus, whose concave side is facing the incident light. This yields the advantage over the first example that the degree of correction is still better. Over and above that it might in certain cases be considered as an advantage, that the first surface is negative, as a result of which the incident beams undergo an increase in section in the corrector, which with the same free aperture of the telescope requires a wider telescope tube than in the first example. The corrector shown in Fig. 4 is achromatised by a suitable choice of the species of glass of the components IV and V.

The convex collecting mirror consists of the central part of the convex corrector surface facing the main mirror, which central part is coated with a reflecting layer of aluminium. The false light is intercepted by the two diaphragms $m$ and $n$.

The construction data of the objective portion are as follows (measures in mm.): radii of curvature of the outer surfaces of the corrector 75.86 and 87.10. The spherical main mirror has a radius of curvature 204 and the convex correcting mirror 87.10. The component IV of the corrector is made from boron silicate crown, $n_D$ being 1.516 and the dispersion number $V = 64.1$. Of the component V made from hard crown $n_D = 1.518$ and $V = 60.2$. The distance between the main mirror and the collecting mirror is 74.

The free aperture of the main mirror is 66; consequently the focal distance is 1.5 times this free aperture.

The free aperture of the objective portion is 60, and the focal distance 420. Consequently an ocular of 21 mms. focal distance permits the use of a 22 x 60 telescope.

The telescope has a total length of 170, the outer diameter of the housing being 75 and that of the prism housing 45; the total weight is 480 g.

Figure 5:
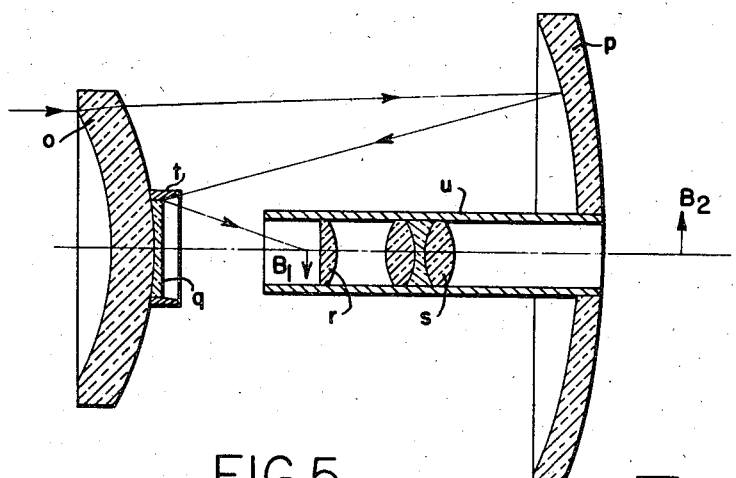
Fig. 5 is a cross-sectional view of still another embodiment of the invention in which the collecting mirror is cemented to the correcting meniscus lens.

Fig. 5 is the optical diagram of the objective portion and the inverting lens-system of one form of construction of the telescope according to the invention having a flat collecting mirror.

The light rays fall into the corrector $o$ and after reflection by the spherical concave mirror $p$ they fall on the flat collecting mirror $q$ which reflects the rays in their initial direction. The inverted image $B_1$ of an object, which is formed by the objective portion consisting of the corrector, the main mirror and the collecting mirror whilst the object is located at a fairly large distance in front of the telescope, is represented as the upright image B₂ by means of an inverting lens system consisting of the field lens r and the inverted lens s proper, which image may be viewed in the conventional way with an ocular. The diaphragms t and u prevent false light from entering the ocular. The flat collecting mirror q jointly with the diaphragm t is fitted to the corrector o, the diaphragm u being used as a setting for the lenses r and s.

In this telescope the optical axes of the objective portion, the inverting lens-system and the ocular coincide, whilst the inverting prism-system is dispensed with.

Figure 6:
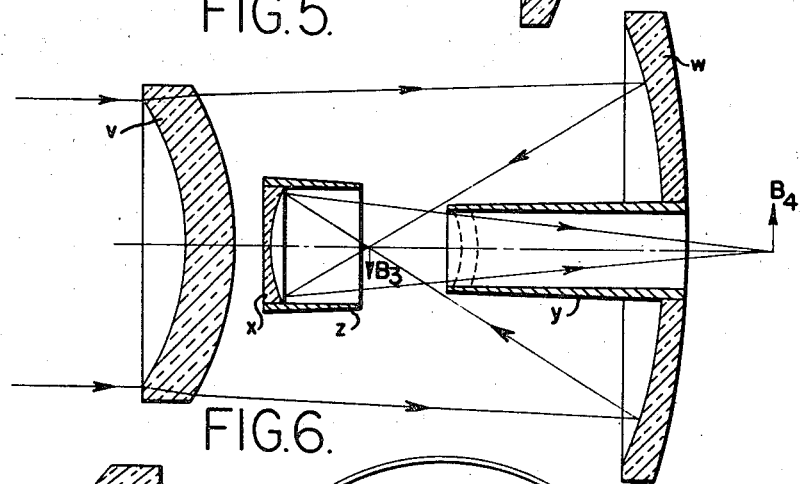
Fig. 6 is a cross-sectional view of another embodiment of the invention employing a concave collecting mirror.

Fig. 6 is the optical diagram of the objective portion of one form of construction of the telescope comprising a concave collecting mirror, according to the invention.

The objective portion consisting of the corrector v and the concave main mirror w, projects the inverted image B₃ of an object in front of the telescope.

Of this inverted image B₃ the concave collecting mirror forms an upright image B₄ which is viewed through an ocular. The diaphragms y and z serve again to shut off false light.

Sometimes it may be useful to add to this form of construction another corrector lens which is placed in the path of the rays between the collecting mirror and the ocular. This second corrector lens is shown in dotted lines in Fig. 6. In this case the diaphragm tube y serves as a setting.

Finally one form of construction of a telescope combined with a finder according to the invention will be described with reference to Figs. 7 and 8. In the present case the combined finder is used for a telescope as described hereinbefore with reference to Figs. 1, 2 and 3.

Fig. 7 shows the corrector A having an aperture B, in which is fitted the finder objective C. The correcting mirror D is pivotally mounted on a shaft E. The torsion spring F is rigidly secured to the correcting mirror D at one end and at its other end it is rigidly fastened to the corrector A. The correcting mirror has rigidly fastened to it the arm G having an aperture H.

Fig. 8 is a lateral view of the correcting mirror viewed in the direction of the optical axis of the telescope. The aperture H is engaged by the hook I forming the end of the flexible rod J which is rigidly secured to the table K. The table K and the compression spring L are enclosed in the tube M wherein the table K is movable by means of the Bowden wire N passing through the wall O of the telescope housing.

When pressing the knob P of the Bowden wire the table K is pushed downwards against the action of the compression spring L. The flexible rod J likewise descends and the correcting mirror swings about the shaft E against the action of the torsion spring F until the correcting mirror occupies the position indicated in dotted lines in Figs. 7 and 8.

In this position the path between the finder objective and the aperture in the main mirror (Fig. 1) is clear, so that the finder image is viewed in the ocular. Upon releasing the Bowden wire, the collecting mirror, under the joint action of the torsion spring F and the compression spring L, resumes its initial position (fixed by an abutment stop), not shown in the drawing for simplicity as a result of which the rays from the finder objective are intercepted and the image formed by the corrector, main mirror and correcting mirror is viewed.

In the present case the focal distance of the finder objective is 150 mms., and that of the objective portion 465 mms. so that when using an ocular having a focal distance of 21 mms. the enlargement of the main telescope is 22 x and that of the finder 7.5 x, the field of view of the finder being three times as large as that of the telescope.

In this way a telescope is obtained comprising a parallax-free entirely internal finder without making use of any additional mirrors and without a separate finder tube, the changing over from the finder-image to the telescope-image and conversely during observation through the same ocular taking place easily and swiftly through the intermediary of the Bowden wire.

What we claim is:

1. A telescope comprising a concave spherical main mirror having a central aperture and having an optical axis centered in said aperture, a refractive correcting element having spherical outer surfaces centered about the axis of said main mirror and positioned to intercept and refract rays of light before they strike said main mirror to correct for spherical aberration in said main mirror, a collecting mirror centered about the axis of said main mirror and positioned to intercept and reflect light rays directly reflected by said main mirror without passing through said refractive correcting element, an opaque optical tube fitting in said aperture in said main mirror and extending towards said collecting mirror a distance sufficient to prevent the direct access of light from said correcting element through said aperture, and an ocular comprising an optically refractive system for receiving light rays reflected from said collecting mirror through said optical tube to permit an observer to view the image on said collecting mirror formed by said refractive element and said main mirror.

2. A telescope comprising a concave spherical surface-reflecting main mirror having a central circular aperture and having an optical axis centered in said aperture, a refractive correcting element having spherical outer surfaces centered about the axis of said main mirror and positioned to intercept and refract rays of light before they strike said main mirror to correct for spherical aberration in said main mirror, a secondary mirror interposed between said correcting element and said main mirror and positioned symmetrically with respect to said axis and having a reflecting surface facing the reflecting surface of said main mirror, a tubular element of opaque material positioned in said circular aperture in said main mirror and extending towards said secondary mirror a distance substantially to prevent the direct passage of light rays from said correcting element through said aperture, and an ocular comprising an optically refractive system for receiving reflected light rays from said secondary mirror through said optical tube to permit the observer to view the image on said collecting mirror formed by said refractive element and said main mirror.

3. A telescope comprising a concave spherical main mirror having a central aperture and having an optical axis centered in said aperture, a meniscus correcting element positioned symmetrically of said optical axis and arranged to correct by refraction for the spherical aberration produced in said telescope by said mirror, a collecting mirror interposed between said correcting element and said main mirror and positioned symmetrically with respect to said axis and having a reflecting surface facing the reflecting surface of said main mirror, an opaque optical tube fitting in said aperture in said main mirror and extending towards said collecting mirror a distance sufficient substantially to prevent the direct access of light from said correcting element to said aperture, and an ocular comprising an optically refractive system for receiving reflected light rays from said collecting mirror through said optical tube to permit an observer to view the image on said collecting mirror formed by said refractive element and said main mirror.

4. A telescope comprising a concave spherical surface-reflecting main mirror having a central circular aperture and having an optical axis centered in said aperture, a refractive correcting element having spherical outer surfaces centered about the axis of said main mirror and positioned to intercept and refract rays of light before they strike the main mirror to correct for spherical aberration in said main mirror, a secondary mirror interposed between said correcting element and said main mirror and positioned symmetrically with respect to said axis and having a reflecting surface facing the reflecting surface of said main mirror, said secondary mirror being secured to said correcting element, a tubular element of opaque material positioned in said circular aperture in said main mirror and extending towards said secondary mirror a distance substantially to prevent the direct passage of light rays from said correcting element through said aperture, and an ocular comprising an optically refractive system for receiving reflected light rays from said secondary mirror through said optical tube to permit an observer to view the image on said secondary mirror formed by said refractive element and said main mirror.

5. A telescope comprising a concave spherical surface-reflecting main mirror, having a central circular aperture and having an optical surface the axis of which is centered in said aperture, an element comprising an axially symmetrical refractive zonal correcting portion having spherical outer surfaces and arranged to correct by refraction for the spherical aberration produced in said telescope by said mirror and having a central reflective secondary mirror portion having a spherical surface positioned in a central aperture in said element, an opaque tubular element received by said circular aperture in said main mirror and extending towards said mirror portion a distance substantially to prevent direct passage of light from said refractive portion through said aperture, and an ocular comprising an optically refractive system for receiving reflected light rays from said secondary mirror portion through said optical tube to permit an observer to view an image on said secondary mirror portion formed by said refractive element and said main mirror.

6. A telescope comprising a concave spherical main mirror having a central aperture and having an optical axis centered in said aperture, an element comprising a zonal refractive portion having spherical outer surfaces centered about the axis of said main mirror and positioned to intercept and refract rays of light before they strike said main mirror to correct for spherical aberration in said main mirror and having a central objective portion, a secondary mirror, means to position selectively said secondary mirror in an active position facing said main mirror on said optical axis and interposed between said objective portion and said main mirror aperture and in an inactive position substantially entirely displaced from said active position, an opaque optical tube placed in said main mirror aperture and extending axially a distance to intercept substantially all light rays from direct passage from said refractive portion of said element through said main mirror aperture, an ocular having a focal plane arranged to receive the image formed by said secondary mirror when said secondary mirror is placed in its active position, and an objective lens system substantially in said objective portion of said element and arranged to cast an image at said focal plane when said mirror is placed in its inactive position whereby an observer may selectively view through said ocular the spherical-aberration corrected image formed by said mirrors and the image formed by said objective lens system.

ALBERT BOUWERS.
JOHANNES BECKER.
ADRIAAN HENDRIK van GORCUM.

REFERENCES CITED

The following references are of record in the file of this patent:

UNITED STATES PATENTS

| Number | Name | Date |
| --- | --- | --- |
| 1,060,469 | Mach | Apr. 29, 1913 |
| 2,153,198 | Mihalyi | Apr. 4, 1939 |
| 2,403,660 | Hayward | July 9, 1946 |

FOREIGN PATENTS

| Number | Country | Date |
| --- | --- | --- |
| 82,671 | Germany | Aug. 7, 1895 |
| 190,465 | Switzerland | July 16, 1937 |
| 544,694 | Great Britain | Apr. 23, 1942 |